S. M. CRAWFORD.
STERILIZING AND COOLING APPARATUS.
APPLICATION FILED AUG. 15, 1919.
1,405,816.
Patented Feb. 7, 1922.
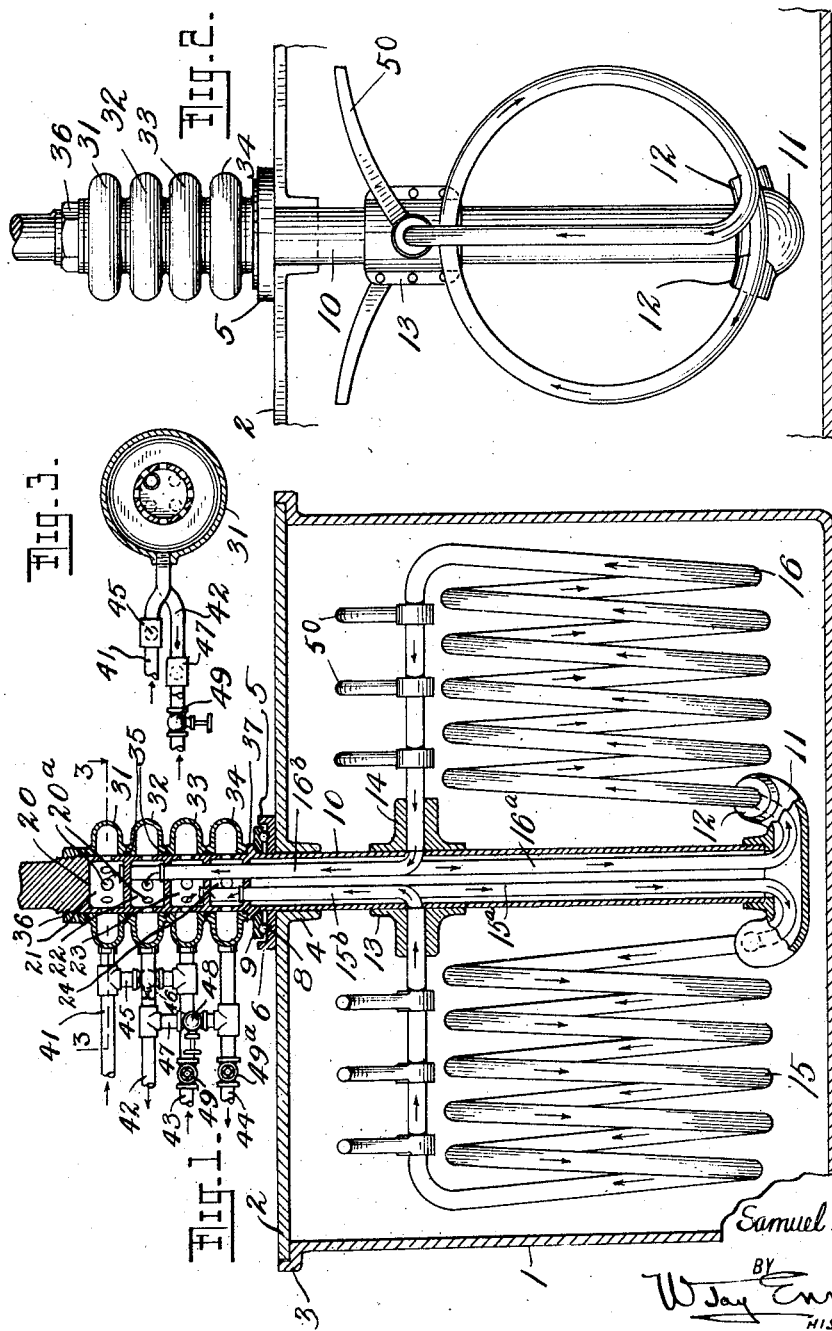
INVENTOR
Samuel M. Crawford
BY
W. Jay Ennisson
HIS ATTORNEY

UNITED STATES PATENT OFFICE.

SAMUEL M. CRAWFORD, OF WINFIELD, NEW YORK.

STERILIZING AND COOLING APPARATUS.

1,405,816.    Specification of Letters Patent.    Patented Feb. 7, 1922.

Application filed August 15, 1919. Serial No. 317,713.

*To all whom it may concern:*

Be it known that I, SAMUEL M. CRAWFORD, citizen of the United States, and resident of Winfield, in the county of Queens and State of New York, have invented certain new and useful Improvements in Sterilizing and Cooling Apparatus, of which the following is a specification.

My invention has reference to apparatus for successively subjecting liquids, particularly milk, to different temperature treatments and is especially adapted for sterilizing.

The sterilization of milk is generally accomplished by first subjecting it for a predetermined period of time to a high temperature, in order to destroy or render inactive the bacteria usually found therein, and then to a low temperature to hinder or prevent, as much as possible, the increase of such bacteria as may have escaped the heating treatment; and also precooling of milk and cream may be desired preliminary to the steps above alluded to.

Furthermore, the sterilization treatment is accompanied by moderate agitation of the milk sufficient to attain an intimate mixture of the medium so that the entire volume be evenly treated and that globules of fat may not form a layer of cream on the surface thereof, and means are also required for removing during the process of treating the milk as effectually as practicable the air bubbles that gather in the body of the liquid.

This invention is primarily concerned with the provision of a compact structure whereby all of the above results may be obtained; and first, in carrying out my improvements I have found that coiled fluid conducting pipes having a horizontally rotary motion and branching in series from a central shaft cause a uniform treatment by the sterilizing medium accompanied by adequate mixing action relatively to the milk. Accordingly the present embodiment of my invention comprises apparatus of the general type with which are combined other important features herein after described and illustrated in the accompanying drawings of which—

Figure 1 is a fragmentary vertical section of the apparatus; Fig. 2 is a side elevation and Fig. 3 is a section through Fig. 1 on line 3—3.

Having reference to the drawings 1 represents a receptacle adapted to contain a liquid to be treated such as milk.

Centrally disposed within the receptacle is the tubular casing 10 vertically supported upon ball bearings 5 that rest upon the cover 2 of the receptacle and is employed for rotatably supporting the two similar sets of coiled tubes 15 and 16, presently to be described. The casing 10 thus suspended within the receptacle 1 terminates at its bottom end in a hollow casting 11 with oppositely disposed spirally branching hollow arms 12 into the threaded orifice of which casting the casing 10 is suitably inserted so as to constitute a continuous communication from the tubular case through the casting and into the arms for receiving respective ends of said spiral coils 15 and 16.

There is also clamped upon the tubular casing 10, so as to come within the chamber of the receptacle 1, a collar 13 which for convenience in attaching to the body of the tubular casing is preferably made in two parts secured together by means of screws or bolts passing through a flange provided for the purpose on either portion of this collar. The collar 13 has two laterally extended hollow branches 14 and two similar arms oppositely disposed upon the terminal casting 11, the last named arm slightly curving upwardly to receive and support the respective ends of the coils 15 and 16 where joined to the pipes 15$^a$, 16$^a$. The hollow arms 14 are placed opposite suitable openings in the casting 10 and in like manner receive the opposite ends of the coils 15, 16, the castings 13 and 11 thus forming the supports for the two coils and also the connecting means whereby these coils are united with the respective pipes 15$^a$, 15$^b$ relative to coil 15 and pipes 16$^a$ and 16$^b$ relative to coil 16.

Two like pipe coils 15 and 16 are oppositely supported upon the rotatable casing 10 being secured to the casing 11 and collar 13 in the manner described and means will now be described whereby the continuous channels or ducts of the respective coils 16, 17 may be connected with the same or different sources of circulating agents.

For the purpose of separate reference to the pipe coils which are structurally similar, but functionally capable of independent service, the left hand coil, as seen in Fig. 1, will be designated by the numeral 15 and the coil opposite as 16.

The coils 15 and 16 conform in their chief aspect to a spiral, horizontally disposed relatively to the primary axis, the outermost turn of each coil terminating in a short upward bend at the bottom, forming a substantially vertical section (see Fig. 2) and then in a second turn of substantially 45 degrees is made to run horizontally above the top of the coil so as to enter the adjacent arm of the collar 13, as best shown in Fig. 1.

The lower ends of the coils 15, 16 in entering the branches 12 of the terminal casting may in any suitable manner be joined to the respective inlet pipes $15^a$ and $16^a$ arranged in parallel within the tubular case 10, while the horizontal return sections running just above the respective spirals, in entering the arms 14 of the collar 13 may in similar manner be connected with the outlet pipes $15^b$ and $16^b$ similarly disposed in the tubular case; the pipes $15^a$ and $15^b$ relating to the coil 15 and the pipes $16^a$, $16^b$ to coil 16.

The respective inlet and outlet pipes extend upwardly in the tubular case 10 to a point above the receptable and thus form with the coils 15, 16 continuous ducts whereby fluids may be conducted down into and through the vat or receptable 1 and accordingly means are provided for circulating different fluids through the separate coils if desired.

To this end the upper or chambered portion 20 of the tubular case 10 is subdivided into separate chambers, four compartments 21, 22, 23, 24 being required in the present embodiment of my invention. Each compartment 21 to 24 has a circumferential series of port holes $20^a$ extending through the wall of the chambered casing 20, these chambered compartments, with the annular cups containing them form the basis of communication between the rotatable case 10 and the stationary source of the circulating fluids that are forced through the coils.

I will now describe the means employed whereby the operable connections referred to are effected in the embodiment of my invention illustrated in the drawings.

Into the floor of each of these compartments enters and terminates an inlet pipe $15^a$ or $16^a$ or an outlet pipe $15^b$ or $16^b$, so as to establish communication between the port holes 20 and the coils 15 and 16. In the manner indicated the ports of the uppermost compartment 21 relate to the intake pipe $16^a$ and the port of the compartment 22 to the outlet pipe $16^b$; while the compartments 23 and 24 connect in like manner the intake $15^a$ and the outlet $15^b$ with their respective port holes $20^a$.

Around the respective compartments are the annular cups 30 comprising a vertical series of four chambers 31, 32, 33 and 34 which are separated one from the other by the packing rings 35 applied in the ordinary method of constructing packing boxes, so as to prevent fluid under pressure escaping or leaking from one chamber to another, while the series of chambers 30 as a whole are provided against pressure escape by means of the packing box which comprises the top member box 36, and the lower member 37.

The annular cups 31 to 34 correspond in length and relative arrangement to the compartments 21 to 24 the chambered case 20 in the order named; that is to say, the annular cup 31 surrounds the compartment 21, and similarly the cups 32, 33 and 34 similarly relating to the compartments 22, 23 and 24. Thus as the tubular case 10 rotates the port holes $20^a$ of each compartment of the chambered position thereof revolve within the cup 30 corresponding thereto.

Each of the annular cups 31, 32, 33, 34 has an opening into one of the pipe connections 41, 42, 43 and 44 which are the respective out-let and in-flow pipes connecting with the separate sources of supply of the cooling and heating fluids on the one hand, and the brine supply on the other. Thus the pipes 41 and 42 connect with the same source and are the respective intake and outlet supply pipes of the coil 16, while the pipes 43 and 44 are the supply and discharge pipes from the other source of circulating fluid to the coil 15, as best shown in Fig. 1.

In the manner described the pipe 41 from a tank containing hot or cold water, or steam under pressure, will first connect such tank with the annular chamber 31 and, through the port holes $20^a$, the chamber of the compartment 21 and thence, through the upright pipe $16^a$, into the spiral coil 16, back into the return upright pipe $16^b$, into the compartment 22, out through the port holes to annular cups 32 and finally through pipe 42 back to supply tank from which also the pipe 41 issues as seen.

In like manner pipes 43 and 44 from a different tank, say of brine, for example, will connect the coil 15 through annular cup 33, to compartment 23, to vertical pipe $15^a$, to coil 15 to vertical return pipe $15^b$, to compartment 44, to annular cup 44 connected with pipe 44.

In order to throw both coils into communication with a single vat or tank, or other source of supply, the respective supply pipes 41 and 43 are connected by a coupling pipe 45 and valve 46, and likewise the return pipes 42 and 44 are similarly connected by a coupling pipe 47 and valve 48. Hence when the valves 46 and 48 are both open the supply pipes 41 and 43 are thrown into a single, communicating duct from either vat or tank to which the pipes 41 and 43 pertain; and similarly the coupling pipe 47 is adapted to connect the return pipes 42 and 44 into a single communicating duct so that when both valves 46 and 48 are open both sources of supply of circulating fluid are connected with the two coils and on the other hand when both valves of the coupling pipes are closed then each coil is connected with one source only. Should it be desired to cut off entirely one of the sources of fluid supply the valves 49 and 49ª as shown in connection with the pipes 43 and 44, Fig. 1 would be closed when the valves 46 and 48 are open.

Above the spiral upon the horizontal section of each pipe coil are the agitating arms or paddles 50 three on each side which are curved backwardly relatively to the normal direction of rotation and are so designed that their upper ends project above the top surface of the fluids. These paddles 50 being thus inclined rearwardly guide up out of the fluid the air bubbles that gather around the paddles.

While the coils 15, 16 are revolving in the liquid to be treated the temperature thereof will rapidly approach that of the circulating agent within the coils which readily conduct the heat from the liquid being treated or lower the temperature thereof as required. Thus when steam for example is forced through the coil pipes 15, 16 the milk or other medium will be brought to substantially the temperature of the circulating fluid and may be maintained at that temperature so long as desired.

It has been the practice heretofore in changing the circulating medium or in modifying the temperature thereof, to employ successively different sources of supply, in the carrying out of which, in the matter of the substitution of water for steam or hot water for cold water, and vice versa, the charge can be effected without overmuch inconvenience by merely increasing or decreasing the quantity of heat to be imparted thereby. But in changing from one fluid to another, as for example in substituting brine or other mixture for steam or water, more or less difficulty is entailed in draining the pipes and otherwise preparing the system for the substituted agency.

I therefore employ two distinct sources from which to supply circulating media with means for operably connecting the one or the other separately, or both together; that is to say, with my improved plant one source may supply one coil member while the other is simultaneously supplying the circulating agent to the other coil. Hence I desire to claim as an important element of my improved apparatus the means described for this interchangeable two-fold adaptability to different circulating media, yet I do not wish to limit my invention to that feature. The horizontal arrangement of the oppositely disposed coils, revoluble upon the central vertical axis of the receptacle within which the coils function, has in itself advantages which contribute to the successful operation of the apparatus as a whole, and constitute an important feature of my improved apparatus.

The operation of my device is as follows:

A liquid to be treated, such as milk, is placed in the receptacle 1 and the tubular shaft 10 is caused to rotate by any convenient means carrying with it the two coils 15, 16 which are thereby caused to revolve slowly within the contents of the receptacle.

As the coils revolve in the liquid the cooling or heating medium which they contain is forced to circulate therethrough, the coil 15 being normally supplied from one source through the feed pipe 41, which when connected with a steam boiler will conduct the steam into the uppermost annular cup 31, thence through port holes 20ª to compartment 21, into coil 16, through the vertical feed pipe 16ª in the rotating casing 10 and back, through vertical pipe 16ᵇ, compartment 22, annular cup 32 and return pipe 42, to the steam boiler from which feed pipe 41 issues, completing the circuit of its circulation.

Likewise steam from a similar boiler may be conducted through supply pipe 43 into and through the coil 15, and then back to the same boiler through the return pipe 44. Or if it is desired the pipes 41 and 42 may connect with a steam boiler while pipes 43 and 44 may run to a vat or container for brine, and either source may be brought into action while the other is disconnected.

Or, if it be desired to have both coils operate from a single source of supply, for example, that source primarily connected with the pipes 41 and 42, by opening the coupling valves 46 and 48 and at the same time closing the valves 49 and 49ª in the supply and return pipes 43 and 44, the circulating fluid will divide a portion passing from supply pipe 41 directly into the annular cups 31 and thence into coil 16 as above described the remaining portion of the flow from pipe 41 passing through the coupling pipe 45 into the supply pipe 43 to the annular cup 33 and then to the coil 15 as explained. In similar manner the circulating fluid returning from coil 16 will pass directly back through annular cups 32 into return pipe 42, while the return flow from coil 15 will pass through annular cup 34 into return pipe 44 and, through coupling pipe 47, to return pipe 42 to vat or boiler to which supply 41 relates.

While the foregoing description of the operation of the machine refers to the alternate uses to which the apparatus may be adapted it will ordinarily be employed to the best advantage by retaining the two distinct sources of supply for circulating the different media, the one for water and steam and the other for brine in which case the coupling valves 46 and 48 will be kept closed and the valves 49 and 49ª will remain open.

Thus water of the desired temperature may be forced through coil 16 if it is desired to subject the milk or cream in the receptacle to the pre-cooling action and thereafter steam will be sent through this same coil merely by heating the water in the boiler to which that coil is attached.

While the coil 16 is thus employed coil 15 will remain unused, but upon the pre-cooling and sterilizing process having been completed the coil 16 will thereupon be rendered void and brine will in turn be forced through the coil 15 until the temperature of the liquid being treated will have been sufficiently lowered.

Having described my invention, what I claim is:

1. In combination in an apparatus for treating liquids, a receptacle, a tube in the receptacle, a paddle on the tube, said paddle extending longitudinally from said tube toward the top of the receptacle and adapted to sweep across the top thereof.

2. In a sterilizing apparatus in combination a rotatable shaft having a series of compartments and a corresponding series of annular cups surrounding said compartments, openings between said compartments and cups, a plurality of hollow coils connected with said shaft, the opposite ends of each of said coils terminating in different compartments, and means for connecting separable sources of circulating media with feed pipes terminating in said annular cups.

3. In a sterilizing apparatus, a receptacle, a conduit mounted for rotation in said receptacle about a vertical axis, and paddles carried on said conduit and curving upwardly and backwardly with respect to the direction of rotation of the conduit for conducting to the top of a contained liquid the air bubbles formed by the agitation.

4. In a sterilizing apparatus, a receptacle, a coil, means for mounting the coil for rotation about a vertical axis and for supplying and removing a fluid to the coil during the rotation, and paddles carried by the coil and curving upwardly and rearwardly with respect to the direction of rotation of the coil.

5. In a sterilizing apparatus, a receptacle, a vertically disposed hollow shaft extending into said receptacle, means for mounting the shaft for rotation about its axis, a plurality of coils supported by the shaft for rotation therewith within the receptacle, and means for supplying to and removing from each coil through the hollow shaft any fluid independently and separately of the other coil.

6. In a sterilizing apparatus, a receptacle, a vertically disposed hollow shaft extending into said receptacle, means for mounting the shaft for rotation about its axis, a plurality of coils supported by the shaft for rotation therewith within the receptacle, said shaft having therein a plurality of distinct and separate chambers at different levels, conduits passing through the shaft and connecting each coil terminal with a corresponding chamber, a plurality of housings surrounding the shaft, one around the portion occupied by each chamber, said chambers having apertures leading to the surrounding housings, and means for passing fluids selectively through each coil by means of the housings, chambers and conduits, independently and separately of the other coils, or the same fluid through both coils at the same time.

7. In a sterilizing apparatus, a receptacle, a vertically disposed hollow shaft extending into said receptacle, means for mounting the shaft for rotation about its axis, a plurality of coils supported by the shaft for rotation therewith within the receptacle, said shaft having therein a plurality of distinct and separate chambers at different levels, conduits passing through the shaft and connecting each coil terminal with a corresponding chamber, a plurality of housings surrounding the shaft, one around the portion occupied by each chamber, said chambers having apertures leading to the surrounding housings, and a conduit connected to each housing for passing fluids through said coils independently of one another.

Signed at New York, in the county of New York and State of New York, this 23rd day of April A.D. 1919.

SAMUEL M. CRAWFORD.